(12) United States Patent
Abramau

(10) Patent No.: US 10,936,380 B1
(45) Date of Patent: Mar. 2, 2021

(54) SYSTEMS AND METHODS FOR FILTERING EVENTS

(71) Applicant: STEALTHbits Technologies, Inc., Hawthorne, NJ (US)

(72) Inventor: Mikalaj Abramau, Minsk (BY)

(73) Assignee: Stealthbits Technologies LLC, Hawthorne, NJ (US)

(*) Notice: Subject to any disclaimer, the term of this patent is extended or adjusted under 35 U.S.C. 154(b) by 15 days.

(21) Appl. No.: 16/198,430

(22) Filed: Nov. 21, 2018

(51) Int. Cl.
*G06F 9/54* (2006.01)
*G06F 16/17* (2019.01)

(52) U.S. Cl.
CPC .............. *G06F 9/542* (2013.01); *G06F 9/543* (2013.01); *G06F 16/1734* (2019.01)

(58) Field of Classification Search
None
See application file for complete search history.

(56) References Cited

U.S. PATENT DOCUMENTS

| 2005/0256956 | A1* | 11/2005 | Littlefield |
| 2006/0236225 | A1* | 10/2006 | Achilles |
| 2008/0077988 | A1* | 3/2008 | Small |
| 2008/0307435 | A1* | 12/2008 | Rehman |
| 2016/0277473 | A1* | 9/2016 | Botsford |

\* cited by examiner

*Primary Examiner* — Syed A Roni
(74) *Attorney, Agent, or Firm* — Austin Rapp

(57) ABSTRACT

A method is described. The method includes checking a raw event generated by a file system against a set of predicates conditions indicative of a high-level user operation. The method also includes filtering multiple raw events with a finite state machine (FSM) in response to determining that the raw event matches a predicate condition. The method further includes identifying a single high-level event for the high-level user operation based on the multiple raw events filtered by the FSM.

21 Claims, 7 Drawing Sheets

SYSTEMS AND METHODS FOR FILTERING EVENTS

TECHNICAL FIELD

The present disclosure relates generally to computers and computer-related technology. More specifically, the present disclosure relates to systems and methods for filtering raw events.

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small handheld computing devices to desktop computer systems to large multi-processor computer systems. In some configurations, multiple computers may communicate in a network environment.

In computing technology, files may be monitored. For example, user operations on files may be monitored for security purposes. In some implementations, file monitoring may be performed using raw events generated by a file system.

DETAILED DESCRIPTION

A method is described. The method includes checking a raw event generated by a file system against a set of predicates conditions indicative of a high-level user operation. The method also includes filtering multiple raw events with a finite state machine (FSM) in response to determining that the raw event matches a predicate condition. The method further includes identifying a single high-level event for the high-level user operation based on the multiple raw events filtered by the FSM.

The predicate condition may include a certain combination of information that indicates a start of a sequence of raw events generated by the file system as part of the high-level user operation.

The FSM may be associated with a file path of the raw event that matches the predicate condition. The FSM may identify one type of high-level event. The FSM may have associated storage that holds the multiple raw events in an order in which the multiple raw events are received.

The FSM may change states in response to a sequence in the multiple raw events associated with the high-level user operation. A final state of the FSM indicates the high-level event.

The single high-level event may be emitted on a processing pipeline in response to identifying the single high-level event. The multiple raw events may be discarded from the processing pipeline.

A computing device is also described. The computing device includes a processor and a memory in electronic communication with the processor. Instructions are executable to check a raw event generated by a file system against a set of predicates conditions indicative of a high-level user operation. Instructions are also executable to filter multiple raw events with a FSM in response to determining that the raw event matches a predicate condition. Instructions are further executable to identify a single high-level event for the high-level user operation based on the multiple raw events filtered by the FSM.

A non-transitory, tangible computer-readable medium is also described. The computer-readable medium includes executable instructions for checking a raw event generated by a file system against a set of predicates conditions indicative of a high-level user operation. The computer-readable medium also includes executable instructions for filtering multiple raw events with a FSM in response to determining that the raw event matches a predicate condition. The computer-readable medium further includes executable instructions for identifying a single high-level event for the high-level user operation based on the multiple raw events filtered by the FSM.

Figure 1:
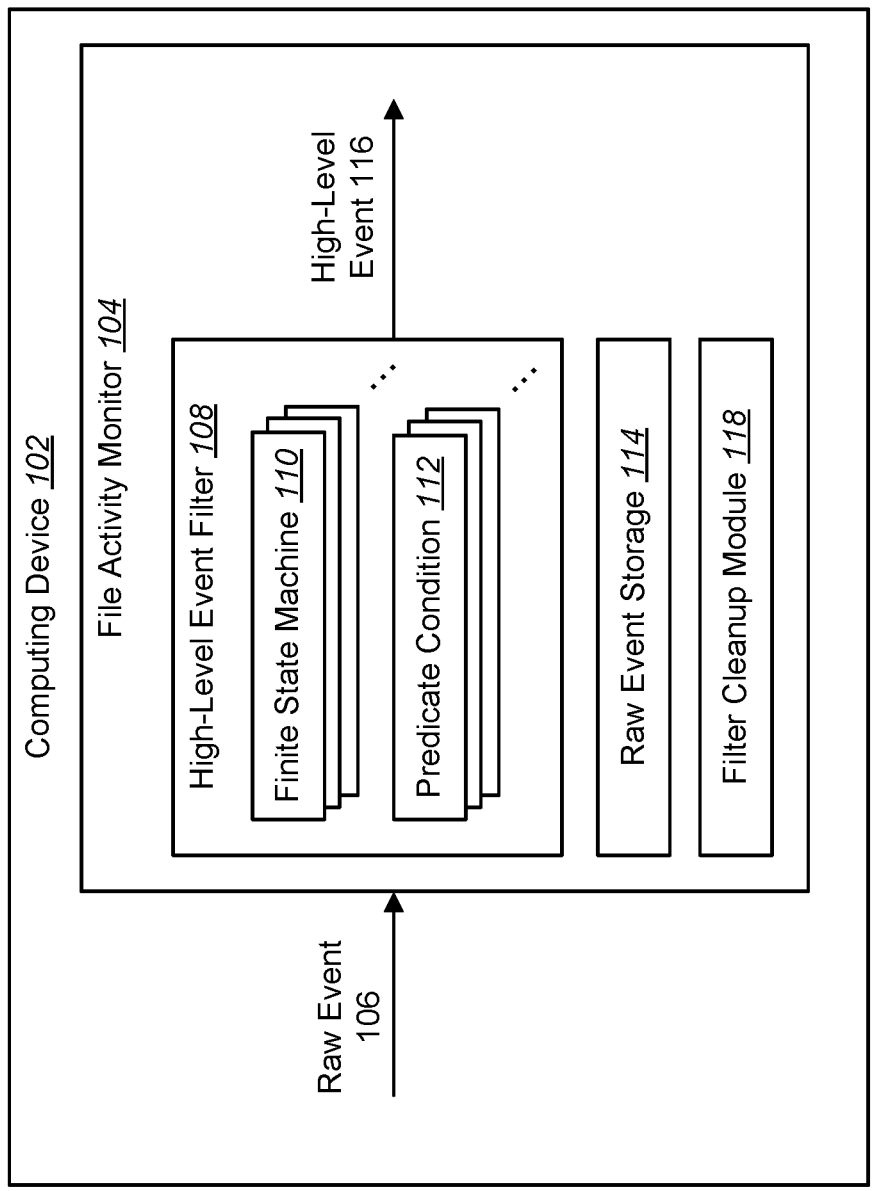
FIG. 1 is a block diagram illustrating one configuration of a computing device in which systems and methods for filtering raw events may be implemented.

FIG. 1 is a block diagram illustrating one configuration of a computing device 102 in which systems and methods for filtering raw events 106 may be implemented. In particular, the systems and methods disclosed herein describe filtering raw events 106 for file activity monitoring.

Examples of the computing device 102 include a desktop computer, laptop computer, tablet computer, server, domain controller, etc. The computing device 102 may be configured to communicate in a network environment. In an implementation, the computing device 102 may be a desktop computer and/or server configured to run a Microsoft® Windows® operating system (OS). In other implementations, the computing device 102 may be a network-attached storage (NAS) server.

In some implementations, the computing device 102 may communicate with one or more remote computing devices in a network. For example, the remote computing devices may be a NAS server.

The computing device 102 may be configured to monitor file activity. For example, the computing device 102 may include a file activity monitor 104 that monitors raw events 106 generated by a file system located on the computing device 102 or a remote computing device. The file activity monitor 104 may be a monitoring service implemented by the computing device 102. A "raw event" may also be referred to as a file event, file system event or system event. A raw event 106 may be a log of an operation implemented by the file system or a real time event captured by the file system mini-filter driver, for example, on the Windows® OS.

In some cases, the raw events 106 may be generated when a user performs a high-level operation on a file. Examples of high-level operations include create new file with specialized software or updating existing one. This single, from the point of view of the final user, operation in fact leads to the multiple raw operations. Examples of raw operations include read, update, delete, rename, or changed permissions of a file. The raw events 106 may indicate file system activity. The file activity monitor 104 may report certain events when users interact with files and may report what high-level operations have occurred.

While monitoring file activity, reporting raw events 106 may not be sufficient. Some high-level user operations in specialized software can result in multiple (e.g., dozens) raw events 106. For example, saving a new document or updating an existing document in word processing applications (e.g., Microsoft® Office®) may result in a sequence of create, delete, read, change permission, and/or updating events. In one example, updating a PowerPoint® file leads to the sequence of raw events 106 illustrated in Table 1.

TABLE 1

| | | |
|---|---|---|
| Rea | C:\Test\MS\powerpoint-pptx.pptx | |
| Add | C:\Test\MS\~$powerpoint-pptx.pptx | |
| Upd | C:\Test\MS\~$powerpoint-pptx.pptx | |
| Upd | C:\Test\MS\~$powerpoint-pptx.pptx | |
| Rea | C:\Test\MS\powerpoint-pptx.pptx | |
| Rea | C:\Test\MS\powerpoint-pptx.pptx | |
| Add | C:\Test\MS\pptBCBA.tmp | |
| Del | C:\Test\MS\pptBCBA.tmp | |
| Add | C:\Test\MS\pptBCBA.tmp | |
| Rea | C:\Test\MS\pptBCBA.tmp | |
| Upd | C:\Test\MS\pptBCBA.tmp | |
| Per | C:\Test\MS\pptBCBA.tmp | |
| Upd | C:\Test\MS\pptBCBA.tmp | |
| Per | C:\Test\MS\pptBCBA.tmp | |
| Ren | C:\Test\MS\powerpoint-pptx.pptx | C:\Test\MS\7EA0A17D.tmp |
| Ren | C:\Test\MS\pptBCBA.tmp | C:\Test\MS\powerpoint-pptx.pptx |
| Per | C:\Test\MS\powerpoint-pptx.pptx | |
| Del | C:\Test\MS\7EA0A17D.tmp | |
| Rea | C:\Test\MS \powerpoint-pptx.pptx | |
| Rea | C:\Test\MS\~$powerpoint-pptx.pptx | |
| Del | C:\Test\MS\~$powerpoint-pptx.pptx | |
| Rea | C:\Test\MS\powerpoint-pptx.pptx | |

As observed in Table 1, a challenge for monitoring file system activity is that for certain application, when a user edits a single file, the application may perform multiple file operations. In an example, when a user initially opens and edits a document in word processor, the word processor may cause the file system to perform several operations (e.g., creating, changing and/or deleting several temporary files) in addition to just writing to the file the user opened and edited. This file system activity may result in a sequence of raw events 106. This extra file system activity may be undesirable noise that makes it appear that the end user directly did these extra file operations, which were actually side effects of the single high-level user operation (e.g., editing a single word processor document). In addition to the example of a word processor, a similar scenario may exist for other types of applications (e.g., spreadsheet, slide presentation, email, etc.).

The systems and methods described herein provide for identifying and removing such noise events from the end-user reported file activity data. The file activity monitor 104 may be configured to differentiate between a user's directly initiated changes (e.g., editing a single document) and incidental file system activity performed as a side effect by the user-invoked application (e.g., word processor). This may be especially problematic when the file being edited resides on a network share. For example, a Microsoft® Windows® share (located on a remote file system, for instance) may only know the name of the security principle performing the file access. The share may have no knowledge of the process name or application involved.

Thus, without filtering raw events 106 as described herein, the data reported by raw events 106 would look like a user is creating and deleting files directly. This may appear as a security violation when in fact it is a side effect of altering documents. In other words, the multiple raw events 106 generated by the file system in response to a user operation may have little value for monitoring file system activity. Instead, it may be desirable to have a single high-level event 116 for the high-level user operation instead of multiple raw events 106.

The file activity monitor 104 may identify high-level events 116 based on the incoming raw events 106. In some implementations, the file activity monitor 104 may identify high-level events 116 such as update, add and/or a sequence of raw events that results in no high-level events and can be discarded without losing any value.

The file activity monitor 104 may receive raw events 106. In some implementations, the raw events 106 may be received from a file system located on the computing device 102. In other implementations, the raw events 106 may be received from a file system on a remote computing device. For example, in the case of a remote NAS device, the file activity monitor 104 may receive the raw events 106 through an application programming interface (API). Therefore, the file activity monitor 104 may receive a stream of raw events 106 corresponding to file system activity.

The file activity monitor 104 may include a high-level event filter 108. The high-level event filter 108 may check a raw event 106 generated by the file system against a set of predicate conditions 112 that are indicative of a high-level user operation. The predicate conditions 112 may be a certain combination of information included in the raw event 106 that indicates the start of a series of raw events 106 generated by the file system as part of a single high-level user operation. In other words, a predicate condition 112 may be a combination of information in a raw event 106 that when present indicates the start of a series of raw events 106 generated in response to a single high-level user operation. For example, a predicate condition 112 may include an "add" of a certain type of file (e.g., powerpoint-pptx.pptx).

Different high-level user operations may have different predicate conditions 112. For example, a user operation to open a file in a certain program may have a different combination of conditions in the raw events 106 than a user operation to open a file in another program. Furthermore, different computing systems may have different predicate conditions 112 for the same user operation. Therefore, the high-level event filter 108 may be configured with a number of different predicate conditions 112 that are associated with certain user operations and/or certain computing systems.

Upon determining that a raw event 106 matches a predicate condition 112, the high-level event filter 108 may begin filtering multiple raw events with a finite state machine (FSM) 110. In some approaches, the high-level event filter 108 may include a number of FSMs 110. A particular FSM 110 may be associated with a given predicate condition 112. Therefore, when a raw event 106 matches a given predicate condition 112, the associated FSM 110 may be triggered to start filtering multiple incoming raw events 106.

A FSM 110 may be configured to detect a sequence in the multiple raw events 106 that is associated with a certain high-level user operation. For example, the FSM 110 may change states in response to a pattern in the multiple raw events 106 associated with the high-level operation. As raw events 106 are received, the FSM 110 may determine if the raw event 106 matches conditions that trigger a state change. The FSM 110 may change states as the different raw events 106 are received in succession. Upon changing state, the FSM 110 may check for the next raw event 106 in the sequence of raw events 106 associated with a high-level user operation. The FSM 110 may continue to change states until a final state is reached.

Raw events 106 issued by the file system that are not associated with the high-level user operation may be disregarded by the FSM 110. For example, it should be noted that raw events 106 for multiple different operations may be issued by the file system in an overlapping fashion. Therefore, a raw event 106 associated with a user operation that is monitored by the FSM 110 may be followed by a number of unrelated raw events 106 before another raw event 106 associated with the user operation is received at the file activity monitor 104.

To differentiate between raw events 106 that are associated with the high-level user operation and unrelated raw events 106, the FSM 110 may be associated with a file path of the raw event 106 that matches the predicate condition 112 that triggers the FSM 110. Then, raw events 106 with the same file path or any other file path that is linked to the FSM file path may be sent to this FSM 110 for processing.

The FSM 110 may have associated storage 114 that holds the multiple raw events 106 in an order in which the multiple raw events 106 are received and filtered. The raw event storage 114 may also store other utility information. For example, the high-level event filter 108 may store a raw event 106 that triggers a state change of the FSM 110 in the raw event storage 114. While in the raw event storage 114, the raw events 106 may be prevented from further processing on a processing pipeline.

As used herein, the processing pipeline is a set of stages that process raw events or detected high-level events with a set of other user-defined filters (e.g., by path, by file type, by user name etc.). The processing pipeline may normalize events from different sources to a common structured data type resolving required information (e.g., converting a user SID/Unix ID to a Name (e.g., netbios name)). The processing pipeline may resolve a remote address of the remote perpetrator into a fully qualified domain name (FQDN) name. The high level event filter 108 may be one stage of the processing pipeline.

The FSM 110 may identify a single high-level event 116 for the high-level user operation based on the multiple raw events 106 filtered by the FSM 110. The final state of the FSM 110 may indicate the high-level event 116. In other words, if the FSM 110 completes changing states, then the FSM 110 has received and identified each of the raw events 106 associated with the high-level user operation.

If the FSM 110 detects the complete sequence of raw events 106 associated with the user operation, then upon reaching the final state, the FSM 110 may identify a single high-level event 116 instead of the sequence of multiple raw events 106. During state changes, the FSM 110 may gather information of possible resulting high-level event 116 (e.g., result filename, type, etc.). If incoming raw events 106 lead to final FSM states, the result may be emitted as the high-level event 116. If the result is successful, a single high-level event 116 may be emitted and accumulated raw events 106 may be discarded.

If the pattern of raw events 106 associated with a user operation is not identified, the FSM 110 may end. In this case, accumulated raw events 106 may be submitted further on the processing pipeline and no new events (e.g., high-level events 116) are emitted. Also in some cases, successful completion of the FSM 110 may result in simply discarding all accumulated raw events 106 without emitting anything.

In the example of Table 1, instead of the multiple raw events 106 issued by the file system in response to a user updating a file, the FSM 110 may identify the single high-level event 116 of updating the file (e.g., Upd CATest\MS\powerpoint-pptx.pptx). Examples of the high-level event 116 may include update file, add file and/or a sequence of raw events that results in no high-level events and can be discarded without losing any value.

In response to identifying the single high-level event 116, the high-level event filter 108 may emit the single high-level event 116 on a processing pipeline. For example, the file activity monitor 104 may use the single high-level event 116 to perform a security violation analysis. The high-level event filter 108 may also discard the multiple stored raw events 106 from the processing pipeline. For example, the raw events 106 stored by the FSM 110 in the raw event storage 114 may be deleted without further processing. Thus, the raw events 106 may be filtered from processing, which may improve the quality of the processing results. If no high-level event 116 is identified by the FSM 110, then the stored raw events 106 may be released from the raw event storage 114 for processing on the processing pipeline.

The high-level event filter 108 may also include a filter cleanup module 118. The filter cleanup module 118 may identify stuck FSMs 110 and may send the stuck FSMs 110 a timeout event. Also, the filter cleanup module 118 may be responsible for deactivating completed FSMs 110. When a completed FSM 110 is deactivated, the FSM 110 may be unlinked from all raw events 106 with which the FSM 110 was previously linked. When a raw event 106 is no longer associated with an active FSM 110, the record about the raw event 106 may be removed. Thus, the next time activity related to this raw event 106 arrives, an attempt to start new FSM 110 will be performed.

Figure 2:
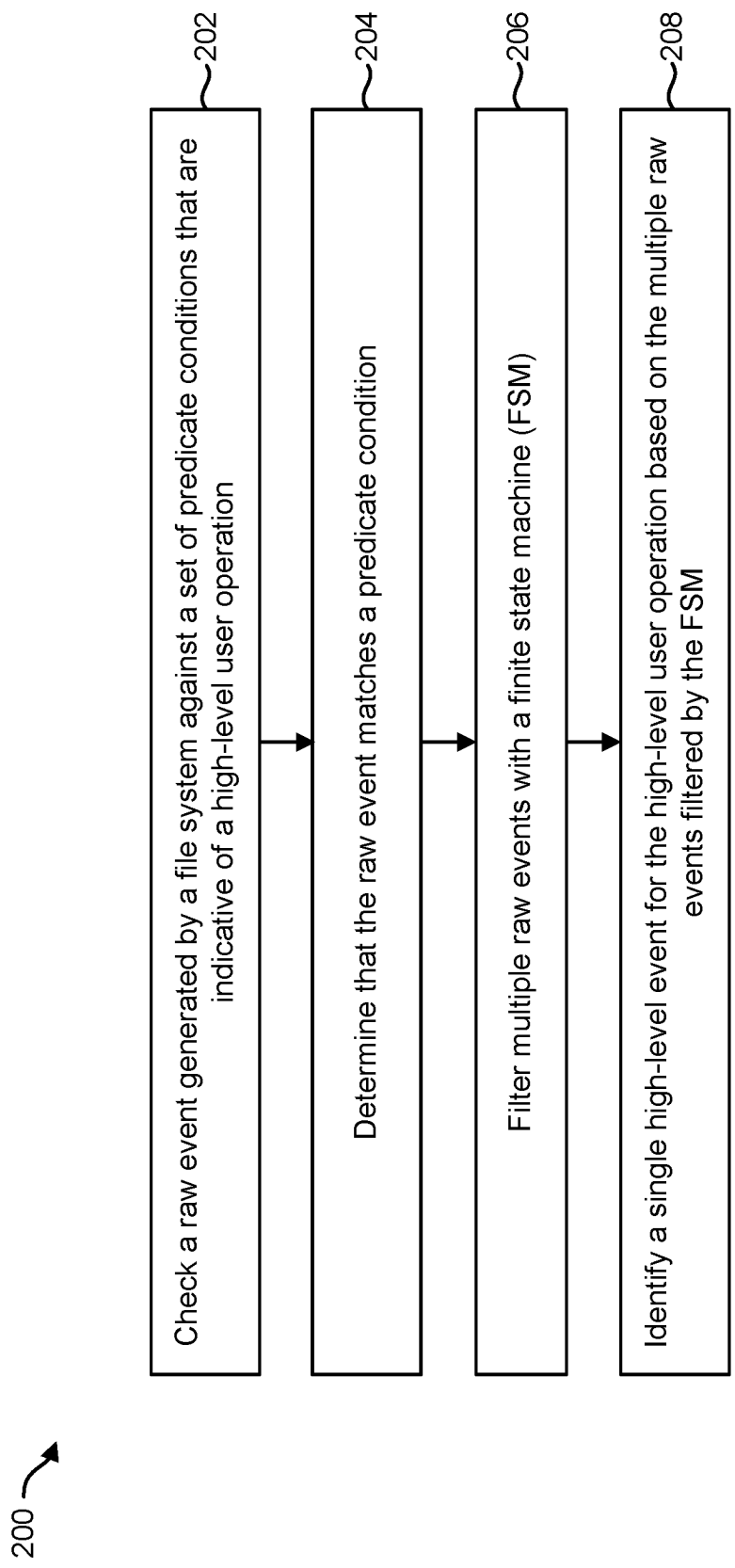
FIG. 2 is a flow diagram illustrating one configuration of a method for filtering raw events.

FIG. 2 is a flow diagram illustrating one configuration of a method 200 for filtering raw events 106. The method 200 may be implemented by a computing device 102. In an implementation, the computing device 102 may be in communication with one or more remote computing devices.

The computing device 102 may check 202 a raw event 106 generated by a file system against a set of predicate conditions 112 that are indicative of a high-level user operation. For example, the raw event 106 may be received from a file system located on the computing device 102 or from a remote computing device. A predicate condition 112 may include a certain combination of information that indicates the start of a sequence of raw events 106 generated by the file system as part of the high-level user operation. Each of the predicate conditions 112 in the set of predicate conditions 112 may be configured for a different high-level user operation.

The computing device 102 may determine 204 that the raw event 106 matches a predicate condition 112. For example, the computing device 102 may determine that a combination of information in the raw event 106 corresponds to the predicate condition 112.

The computing device 102 may filter 206 multiple raw events 106 with a finite state machine (FSM) 110. A particular FSM 110 may be associated with a given predicate condition 112. Therefore, when a raw event 106 matches a given predicate condition 112, the associated FSM 110 may be triggered to start filtering multiple incoming raw events 106.

The FSM 110 may be configured to detect a sequence in the multiple raw events 106 that is associated with a certain high-level user operation. The FSM 110 may change states in response to the sequence in the multiple raw events 106 associated with the high-level user operation.

The FSM 110 may be associated with a file path of the raw event 106 that matches the predicate condition 112 that triggers the FSM 110. Raw events 106 with the same file path or any other file path that is linked to the FSM file path may be sent to the FSM 110 for processing.

As raw events 106 are received, the FSM 110 may determine if the raw event 106 matches conditions that trigger a state change. Upon changing state, the FSM 110 may check for the next raw event 106 in the sequence of raw events 106 associated with a high-level user operation. The FSM 110 may continue to change states until a final state is reached.

The FSM 110 may have associated storage 114 that holds the multiple raw events 106 in an order in which the multiple raw events 106 are received. If a raw event 106 causes a state change in the FSM 110, the raw event 106 may be stored in the raw event storage 114 instead of proceeding on the processing pipeline.

The computing device 102 may identify 208 a single high-level event 116 for the high-level user operation based on the multiple raw events 106 filtered by the FSM 110. The FSM 110 may identify one type of high-level event 116. The final state of the FSM 110 may indicate the high-level event 116. The computing device 102 may emit the single high-level event 116 on the processing pipeline in response to identifying 208 the single high-level event 116.

The computing device 102 may discard the multiple raw events 106 from the processing pipeline. For example, the computing device 102 may delete the multiple raw events 106 that were saved in the raw event storage 114 instead of further processing the multiple raw events 106.

Figure 3:
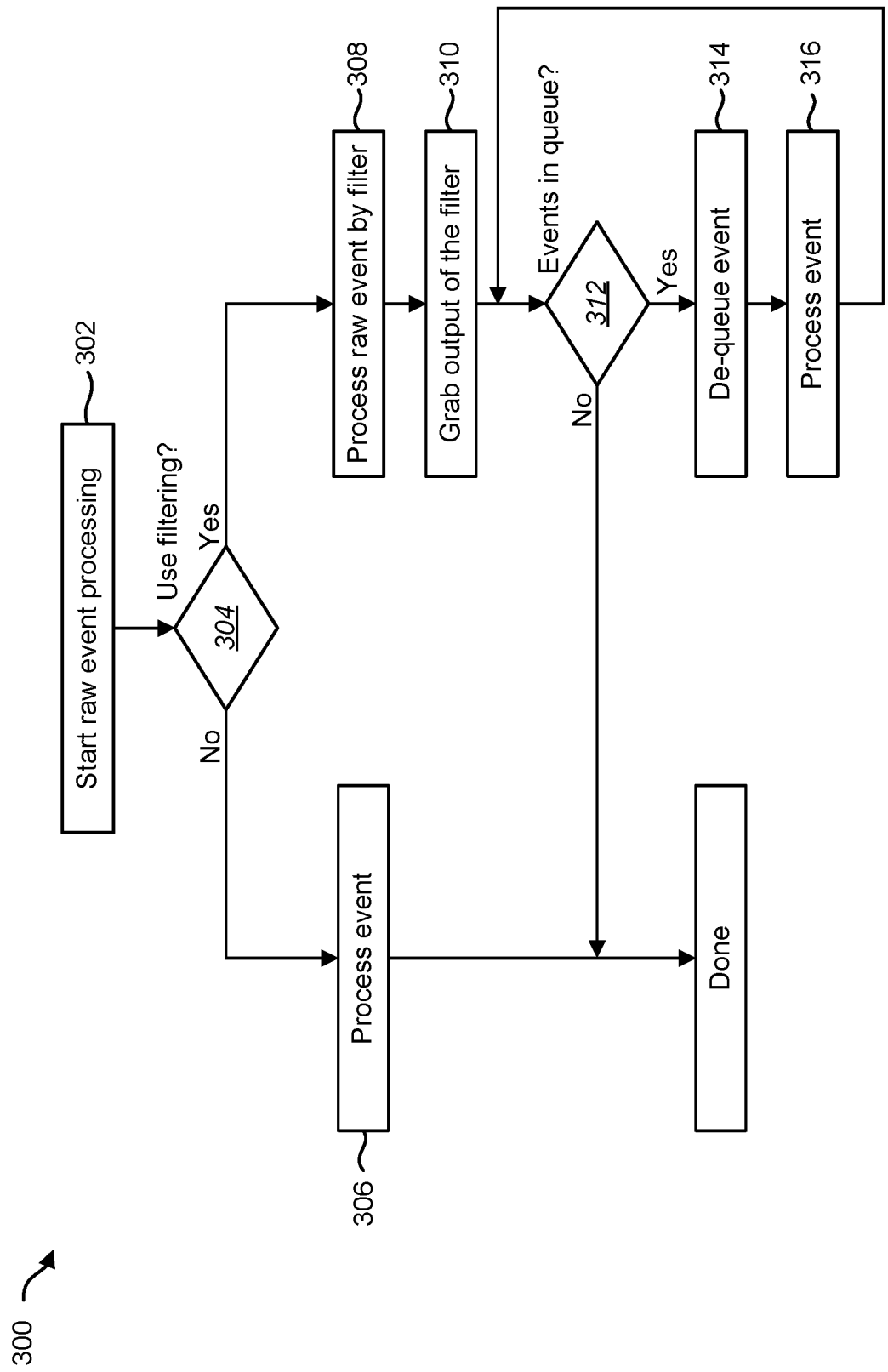
FIG. 3 is a flow diagram illustrating a configuration of a method for raw event processing with filtering.

FIG. 3 is a flow diagram illustrating a configuration of a method 300 for raw event processing with filtering. The method 300 may be implemented by a computing device 102. The computing device 102 may start 302 raw event processing. For example, the computing device 102 may perform constant monitoring of raw events 106 arriving at a monitoring service (e.g., file activity monitor 104). The computing device 102 may receive a raw event 106.

Upon starting 302 raw event processing, the computing device 102 may determine 304 whether to use filtering of the raw events 106. If no filtering is to be performed, the computing device 102 may process 306 the raw event 106. The processing 306 may include applying additional user-defined filters (e.g., by path, user name, extension, process name, etc.). The processing 306 may also include resolving addresses to FQDN format. As part of event normalization, user Security Identifier (SID)/Unix ID can be resolved to a name. After normalization, events can be sent to one or several specified outputs (e.g., file, syslog (udp/tcp/tls), database, Advanced Message Queuing Protocol (AMQP) broker, etc.). If filtering is disabled, then there is no impact on the raw event 106, which is sent directly to an external processing procedure.

If the computing device 102 determines 304 that filtering of the raw events 106 is to be used, then the computing device 102 may process 308 the raw event 106 by a filter. The filter may include a set of active FSMs 110 and a set of predicate conditions 112, which, if evaluated positively, will start new FSMs 110. A method for processing 308 the raw event 106 by filter is described in more detail in connection with FIGS. 4A-4B.

After the raw event 106 is processed, the computing device 102 may grab 310 the output of the filter. The output events may be queued from the filter. This queue may include an array of events that are either some high-level event 116 corresponding to a high-level user operation detected by the filter, a current raw event 106 that was not processed by any dedicated active filters, or some raw events 106 that were grabbed from the filters that were ended by timeout.

The computing device 102 may determine 312 whether there are events in the queue. If there is a queued event, then the computing device 102 may de-queue 314 the event (e.g., remove the event from the queue) and may process 316 the event. For example, all the grabbed events, if any, may be sent to the external processing routine for processing.

Figure 4A:
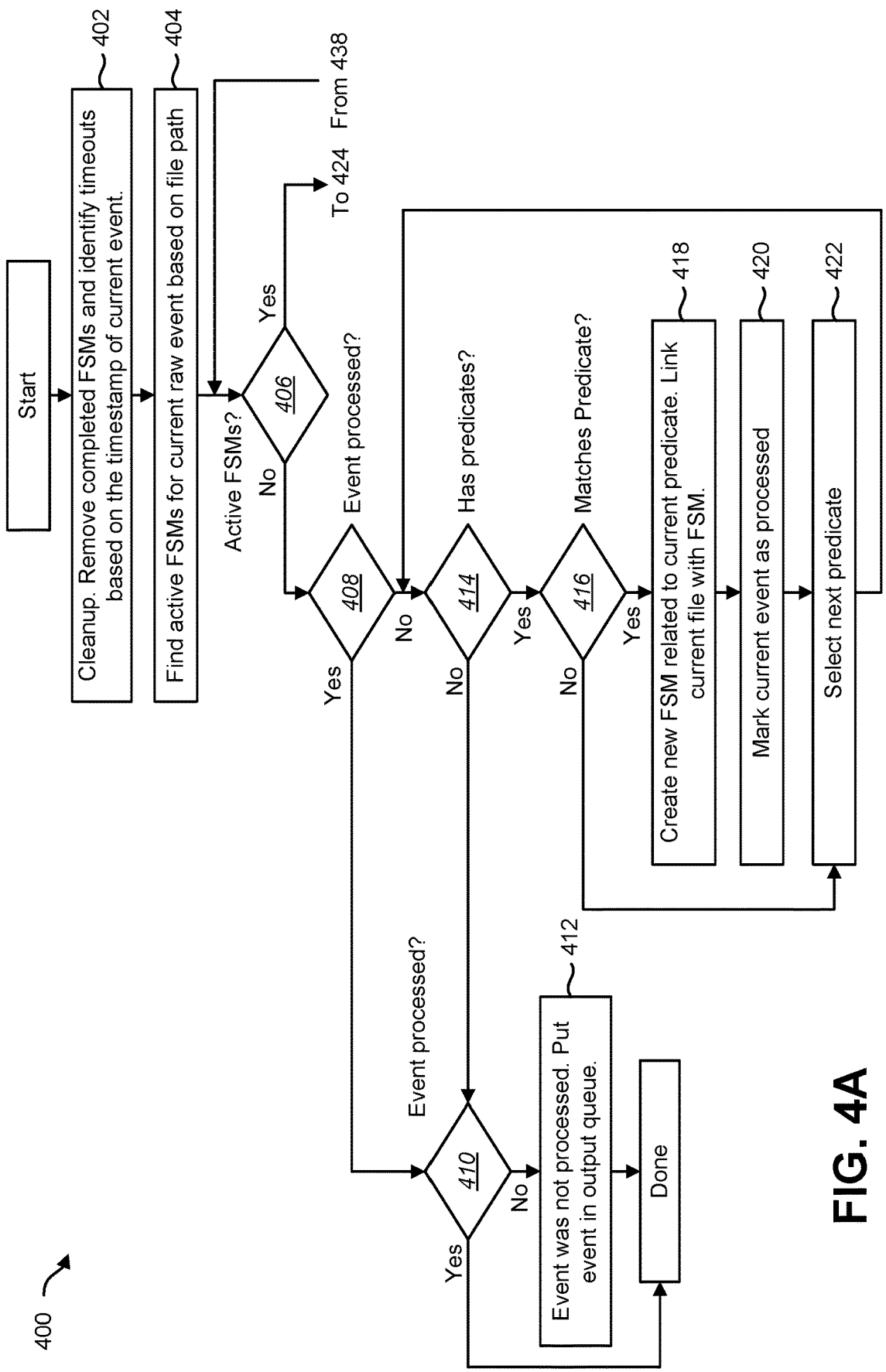
FIGS. 4A and 4B depict a flow diagram illustrating an example of a method for raw event processing by filter.
Figure 4B:
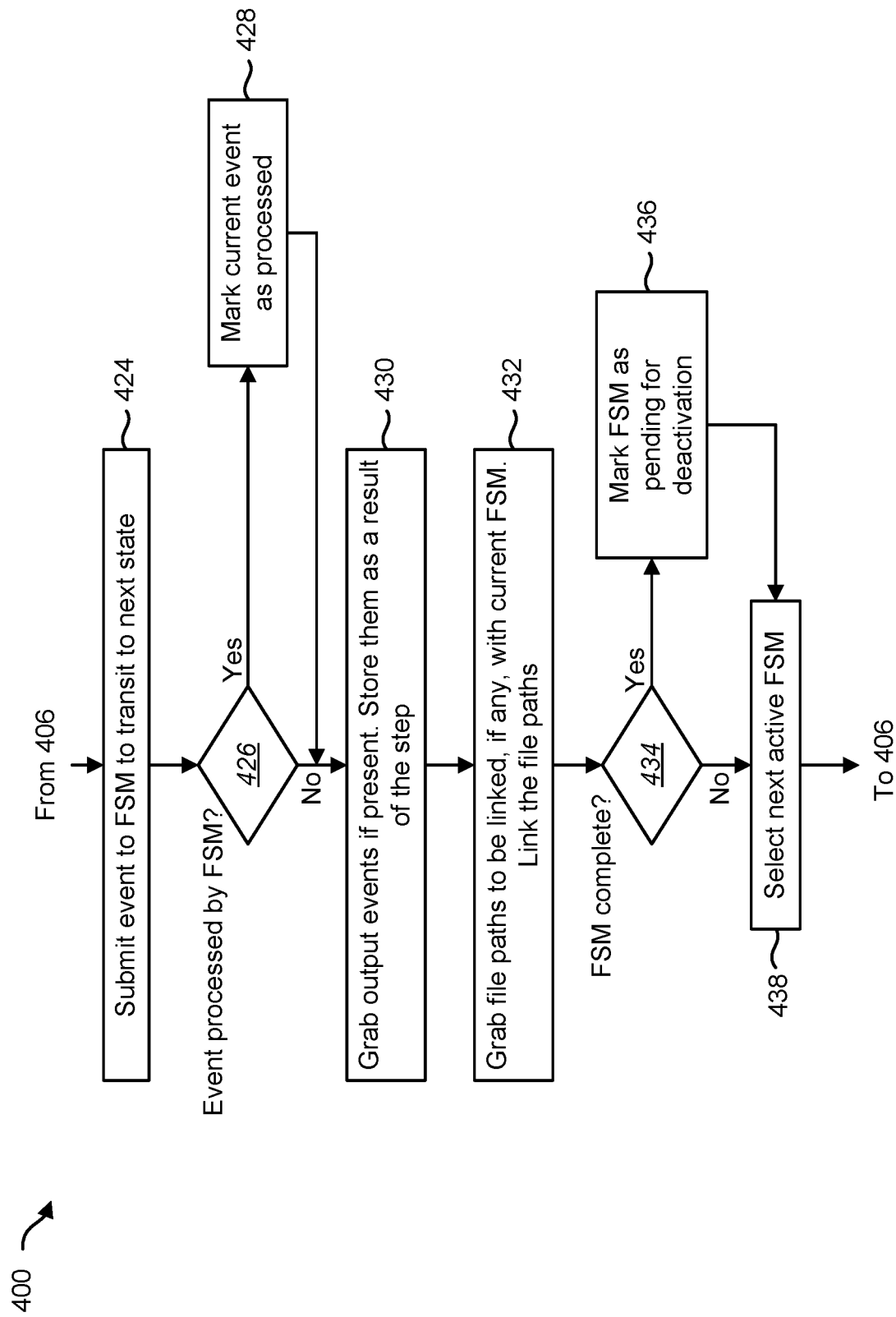

FIGS. 4A and 4B depict a flow diagram illustrating an example of a method 400 for raw event processing by filter. The method 400 may be implemented by a computing device 102. The computing device 102 may start raw event processing.

In step 402, the computing device 102 may perform cleanup. As some file activity can be partially similar to what a dedicated FSM 110 expects to recognize, sometimes an active FSM 110 may become stuck in a state without completing. To be able to terminate failed high-level event recognition, a cleanup procedure may be invoked. An example of a cleanup procedure is described in connection with FIG. 5. For example, the computing device 102 may remove (e.g., deactivate) completed FSMs 110 and/or identify timeouts based on the timestamp of the current raw event 106.

The computing device 102 may find 404 active FSMs 110 for the current raw event 106 based on the file path. After cleanup, the computing device 102 may select a subset of related filters from a set of active FSMs 110 using the file path of the current raw event 106. The FSM 110 may be used as a dedicated filter that tries to identify one type of activity. This FSM 110 may be associated with a file path. Subsequent raw events 106 with the same file path or any other raw events 106 with file paths linked to the FSM path may be sent to the active FSM 110 for processing.

The computing device 102 may determine 406 if there are any active FSMs 110 for the current raw event 106. If the current raw event 106 has one or more active FSMs 110, then the computing device 102 may determine 408 whether the raw event 106 has been processed. If there are active FSMs 110 for the current raw event 106, then the raw event 106 is sent to this FSM(s) 110. The processing routine of each FSM 110 may return a Boolean flag when the current raw event 106 was processed by this FSM 110. If at least one processing routine of the active FSM(s) 110 returned "true," then the current raw event 106 is considered processed. In some implementations, on the very low level, the processing routine may return "true" if the raw event 106 was stored inside the raw event storage 114 of the filter. If the raw event 106 has been processed, then the method 400 may end.

If the computing device 102 determines 408 that the raw event 106 has not been processed, then the computing device 102 may determine 414 whether there is a predicate condition 112 in a set of predicate conditions 112 that should be checked against the raw event 106. Each raw event 106 may be checked against a set of predicate conditions 112 that indicate a possible chain of raw events 106 that can be identified as some high-level user operation. If there are no predicate conditions 112, then the computing device 102 may determine 410 whether the raw event 106 was processed. In step 412, if the raw event 106 was not processed, the computing device 102 may put the raw event 106 in the output queue and the method 400 may end. In other words, in step 412, when a raw event 106 is not processed by any active FSM 110 and has not triggered any new FSMs 110, then the raw event 106 may be considered as insignificant and sent directly to the filter output.

If the computing device 102 determines 414 that there are predicate conditions 112, then the computing device 102 may determine 416 whether a predicate condition 112 matches the raw event 106. If a predicate condition 112 is satisfied, the activity chain may be started. If no active FSM 110 was found for the current raw event 106, then the computing device 102 may attempt to start new FSM 110 based on a set of stored predicate conditions 112. If the predicate condition 112 matches the raw event 106, then in step 418 the computing device 102 may create a new FSM 110 related to the current predicate condition 112. The computing device 102 may also link the current raw event 106 with the FSM 110. The computing device 102 may then mark 420 the current raw event 106 as processed. The computing device 102 may select 422 the next predicate condition 112 for evaluating the raw event 106.

If the computing device 102 determines 406 that there are active FSMs 110 for the current raw event 106, then in FIG. 4B, the computing device 102 may submit 424 the raw event 106 to an active FSM 110 to transit to the next state 424. Each active FSM 110 may receive the current raw event 106. The computing device 102 may determine 426 whether the raw event 106 was processed by the FSM 110. For example, the computing device 102 may determine whether the FSM 110 changed state in response to the raw event 106. If the FSM 110 processed the raw event 106, then the computing device 102 may mark 428 the raw event 106 as processed.

In step 430, the computing device 102 may grab output events if present. For example, if the FSM 110 processes the current raw event 106 and this results in a final FSM state, the FSM 110 may output a high-level event 116. The computing device 102 may store the output events as the result of this step. If processing of the raw event 106 leads to some output from the active FSM 110, then the high-level event 116 may be stored and later sent to external processing (e.g., Step 316 in FIG. 3).

The computing device 102 may grab 432 file paths that are to be linked with the current FSM 110. During a state change in the FSM 110, some actions may be performed. One action may be to link a new file name to the current FSM 110 that adds the new file path (in the case of a rename operation, for example) to the list of paths that later should be linked. The actual link may be performed in step 432. For example, the computing device 102 may link temporary file paths of the raw event 106 with the current FSM 110. The computing device 102 may link the file paths with the current FSM 110.

The computing device 102 may determine 434 whether the FSM 110 is complete. For example, the computing device 102 may determine whether the FSM 110 has achieved a final state. If the FSM 110 is complete, then the computing device 102 may mark 436 the FSM 110 as pending for deactivation. For example, if the active FSM 110 has completed, it may be marked for deletion and may be completely removed in a cleanup procedure. The computing device 102 may then select 438 the next active FSM 110.

If the computing device 102 determines 406 that there are additional active FSMs 110 for the current raw event 106, then the computing device 102 may submit 424 the current raw event 106 to the next active FSM 110. Otherwise, the computing device 102 may determine 408 whether the raw event 106 has been processed as described above.

In some implementations, stored raw events 106 may be discarded during a state change if a specific action is attached to this transition. For example, during the final state change action, 'discard accumulated events' may be performed that effectively leads to a raw event storage 114 cleanup. In some cases, cleanup can be performed in the middle of the detection cycle if it is definitely known that accumulated raw events 106 are useless.

Figure 5:
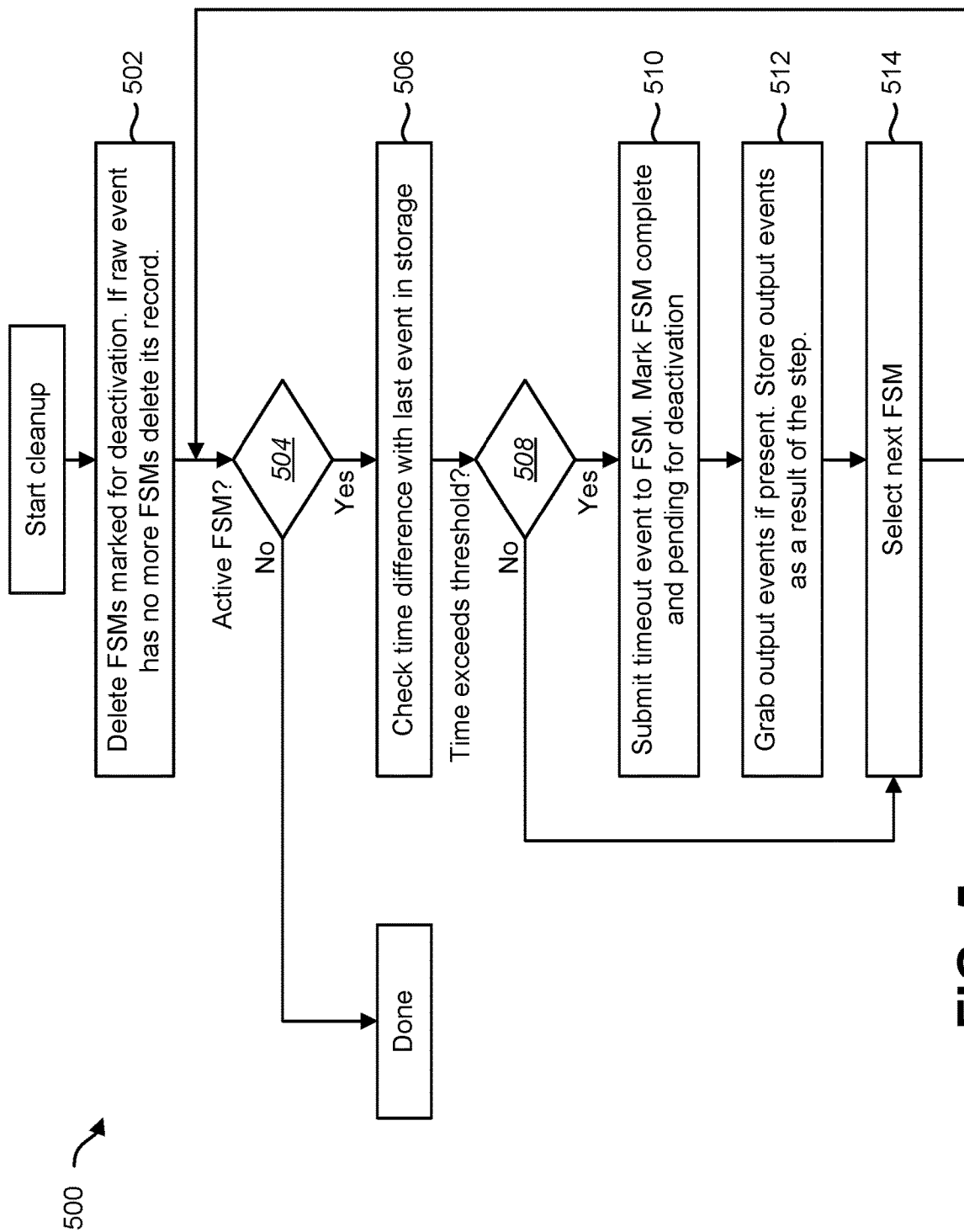
FIG. 5 is a flow diagram illustrating an example of a method for a cleanup procedure for filtering raw events.

FIG. 5 is a flow diagram illustrating an example of a method 500 for a cleanup procedure for filtering raw events 106. The method 500 may be implemented by a computing device 102.

In some circumstances, an active FSM 110 may become stuck. For example, a raw event 106 may match a predicate condition 112 to start an FSM 110, but subsequent raw events 106 do not advance the state of the FSM 110 to a final state. To avoid dangling FSMs 110, a timeout event may be used. Based on the current raw event timestamp this cleanup procedure may identify stuck FSMs 110 and give them a chance to finalize their procedure through an emitted timeout event.

The computing device 102 may start the cleanup procedure of method 500. For example, the computing device 102 may perform method 500 in step 402 described in connection with FIG. 4A. In step 502, the computing device 102 may delete FSMs 110 marked for deactivation. For example, upon completing a final state change, an FSM 110 may be marked for deactivation. The computing device 102 may also delete the record of a raw event 106 that has no more active FSMs 110.

The computing device 102 may determine 504 whether there are active FSMs 110. For a given active FSM 110, the computing device 102 may check 506 the time difference with the last raw event 106 in storage 114. The computing device 102 may determine 508 whether the time between the current raw event 106 and the last raw event 106 in storage 114 exceeds a threshold. If the time exceeds the threshold, then in step 510, the computing device 102 may submit a timeout event to the FSM 110. The computing device 102 may mark the FSM 110 as complete and pending for deactivation.

In step 512, the computing device 102 may grab the output events (e.g., stored raw events 106) if present. The computing device 102 may store the output events as the result of this step. Therefore, if the timeout event resulted in some raw events 106, the raw events 106 may be grabbed and later submitted to the external processing routine (e.g., step 316 in FIG. 3).

The computing device 102 may select 514 the next active FSM 110. If the computing device 102 determines that there is another active FSM 110, then the computing device 102 may check 506 the time difference for this next active FSM 110 with the last raw event 106 in storage for this FSM 110. If the computing device 102 determines 504 that there are no active FSMs 110, then the method 500 may end.

Figure 6:
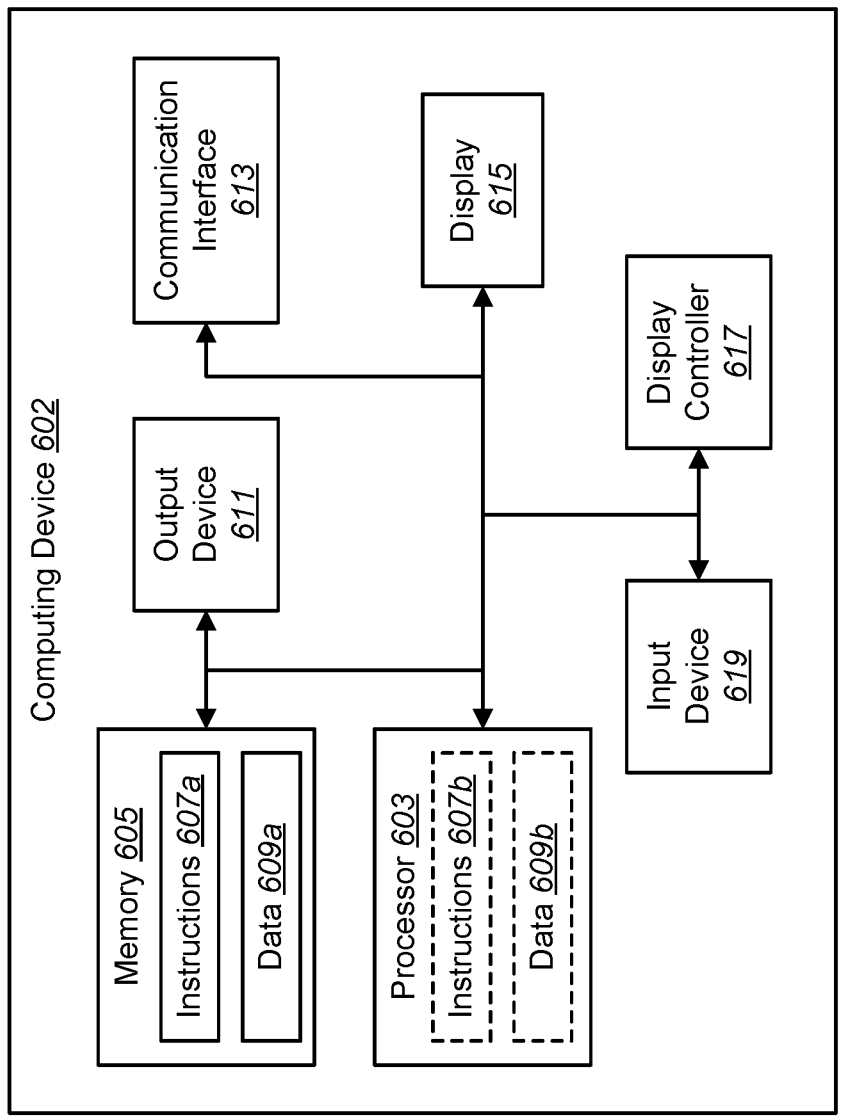
FIG. 6 is a block diagram illustrating components that may be utilized by a computing device.

FIG. 6 is a block diagram illustrating components that may be utilized by a computing device 602. The computing device 602 may be configured for filtering raw events 106 as described herein.

The computing device 602 may communicate with other electronic devices through one or more communication interfaces 613. Communication through the communication interface 613 may be achieved through different methods such as wired communication, wireless communication or both wired and wireless communication. For example, the communication interface 613 may be a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The computing device 602 may receive and transmit information through one or more input devices 619 and one or more output devices 611. The input devices 619 may be a keyboard, mouse, microphone, remote control device, button, joystick, trackball, touchpad, lightpen, etc. The output devices 611 may be a speaker, printer, etc. A display device 615 is an output device 611 that may be included in a computer system. Display devices 615 may project information through different technologies, such as liquid crystal display (LCD), light-emitting diode (LED), gas plasma, electroluminescence, a cathode ray tube (CRT) or the like.

A processor 603 controls the operation of the computing device 602 and may be a microprocessor, a microcontroller, a digital signal processor (DSP) or other device known in the art. A memory 605 may be included in the computing device 602 and includes instructions 607a and data 609a to assist the processor 603 in operating the computing device 602. The memory 605 may send program instructions 607b and/or data 609b to the processor 603 in order for the processor 603 to perform logical and arithmetic operations according to methods disclosed herein. The processor 603 may execute one or more of the instructions stored in the memory 605 to implement one or more of the systems and methods disclosed herein.

Data 609a stored in the memory 605 may be converted to text, graphics and/or moving images (as appropriate) by a display controller 617. Of course, FIG. 6 illustrates only one possible configuration of a computing device 602. Various other architectures and components may be utilized.

In an implementation, the computing device 602 may be a headless server. For example, the computing device 602 may be configured to provide services to other computing devices with or without peripheral input/output interfaces.

In another implementation, the computing device 602 may be configured to run on desktop and server hardware, both physical and virtual. In yet another implementation, the computing device 602 may be configured to run desktop and server Microsoft Windows operating systems.

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth, including virtual. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A method, comprising:
checking a raw event generated by a file system against a set of predicate conditions indicative of a high-level user operation;

creating a finite state machine (FSM) in response to determining that the raw event matches a predicate condition;
filtering multiple raw events with the FSM, wherein the FSM changes states in response to a sequence in the multiple raw events associated with a high-level user operation, and wherein the multiple raw events comprise logs of operations implemented by the file system;
identifying a single high-level event for the high-level user operation based on the multiple raw events filtered by the FSM;
marking the FSM for deactivation;
deleting the FSM marked for deactivation; and
selecting a next active FSM.

2. The method of claim 1, wherein the predicate condition comprises a certain combination of information that indicates a start of a sequence of raw events generated by the file system as part of the high-level user operation.

3. The method of claim 1, wherein the FSM is associated with a file path of the raw event that matches the predicate condition.

4. The method of claim 1, wherein the FSM identifies one type of high-level event.

5. The method of claim 1, wherein the FSM has associated storage that holds the multiple raw events in an order in which the multiple raw events are received.

6. The method of claim 1, wherein a final state of the FSM indicates the high-level event.

7. The method of claim 1, further comprising:
emitting the single high-level event on a processing pipeline in response to identifying the single high-level event; and
discarding the multiple raw events from the processing pipeline.

8. A computing device, comprising:
a processor;
a memory in electronic communication with the processor; and
instructions stored in the memory, the instructions being executable to:
check a raw event generated by a file system against a set of predicate conditions indicative of a high-level user operation;
create a finite state machine (FSM) in response to determining that the raw event matches a predicate condition;
filter multiple raw events with the FSM, wherein the FSM changes states in response to a sequence in the multiple raw events associated with a high-level user operation, and wherein the multiple raw events comprise logs of operations implemented by the file system;
identify a single high-level event for the high-level user operation based on the multiple raw events filtered by the FSM;
mark the FSM for deactivation;
delete the FSM marked for deactivation; and
select a next active FSM.

9. The computing device of claim 8, wherein the predicate condition comprises a certain combination of information that indicates a start of a sequence of raw events generated by the file system as part of the high-level user operation.

10. The computing device of claim 8, wherein the FSM is associated with a file path of the raw event that matches the predicate condition.

11. The computing device of claim 8, wherein the FSM identifies one type of high-level event.

12. The computing device of claim 8, wherein the FSM has associated storage that holds the multiple raw events in an order in which the multiple raw events are received.

13. The computing device of claim 8, wherein a final state of the FSM indicates the high-level event.

14. The computing device of claim 8, further comprising instructions executable to:
emit the single high-level event on a processing pipeline in response to identifying the single high-level event; and
discard the multiple raw events from the processing pipeline.

15. A non-transitory, tangible computer-readable medium, comprising executable instructions for:
checking a raw event generated by a file system against a set of predicate conditions indicative of a high-level user operation;
creating a finite state machine (FSM) in response to determining that the raw event matches a predicate condition;
filtering multiple raw events with the FSM, wherein the FSM changes states in response to a sequence in the multiple raw events associated with a high-level user operation, and wherein the multiple raw events comprise logs of operations implemented by the file system;
identifying a single high-level event for the high-level user operation based on the multiple raw events filtered by the FSM;
marking the FSM for deactivation;
deleting the FSM marked for deactivation; and
selecting a next active FSM.

16. The computer-readable medium of claim 15, wherein the predicate condition comprises a certain combination of information that indicates a start of a sequence of raw events generated by the file system as part of the high-level user operation.

17. The computer-readable medium of claim 15, wherein the FSM is associated with a file path of the raw event that matches the predicate condition.

18. The computer-readable medium of claim 15, wherein the FSM identifies one type of high-level event.

19. The computer-readable medium of claim 15, wherein the FSM has associated storage that holds the multiple raw events in an order in which the multiple raw events are received.

20. The computer-readable medium of claim 15, wherein a final state of the FSM indicates the high-level event.

21. The computer-readable medium of claim 15, further comprising executable instructions for:
emitting the single high-level event on a processing pipeline in response to identifying the single high-level event; and
discarding the multiple raw events from the processing pipeline.

* * * * *

UNITED STATES PATENT AND TRADEMARK OFFICE
CERTIFICATE OF CORRECTION

| | | |
|---|---|---|
| PATENT NO. | : 10,936,380 B1 | Page 1 of 1 |
| APPLICATION NO. | : 16/198430 | |
| DATED | : March 2, 2021 | |
| INVENTOR(S) | : Mikalaj Abramau et al. | |

It is certified that error appears in the above-identified patent and that said Letters Patent is hereby corrected as shown below:

In the Specification

In Column 6, Line 7 please delete "CATest\MS\powerpoint-pptx.pptx)." and replace it with --C:\Test\MS\powerpoint-pptx.pptx).--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*